US006925460B2

(12) United States Patent
Kummamuru et al.

(10) Patent No.: US 6,925,460 B2
(45) Date of Patent: Aug. 2, 2005

(54) CLUSTERING DATA INCLUDING THOSE WITH ASYMMETRIC RELATIONSHIPS

(75) Inventors: Krishna Kummamuru, New Delhi (IN); Raghuram Krishnapuram, New Delhi (IN); Pradeep Kumar Dubey, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 09/815,616

(22) Filed: Mar. 23, 2001

(65) Prior Publication Data

US 2002/0174119 A1 Nov. 21, 2002

(51) Int. Cl.$^7$ .............................................. G06F 17/30
(52) U.S. Cl. ......................... 707/3; 382/173; 382/176; 707/5
(58) Field of Search ..................... 707/2, 3, 6, 104.1, 707/5; 702/19; 706/2; 382/174, 173, 176

(56) References Cited

U.S. PATENT DOCUMENTS

| | | | |
|---|---|---|---|
| 5,630,018 A | * 5/1997 | Hayashi et al. | ................. 706/2 |
| 5,638,543 A | 6/1997 | Pedersen et al. | |
| 5,841,437 A | * 11/1998 | Fishkin et al. | ................. 707/3 |
| 5,867,164 A | 2/1999 | Bornstein et al. | |
| 5,963,969 A | 10/1999 | Tidwell et al. | |
| 6,141,443 A | * 10/2000 | Nakao et al. | ............... 382/174 |
| 6,289,354 B1 | * 9/2001 | Aggarwal et al. | ....... 707/104.1 |
| 6,468,476 B1 | * 10/2002 | Friend et al. | .................. 702/19 |
| 6,567,936 B1 | * 5/2003 | Yang et al. | ..................... 707/3 |
| 2002/0099702 A1 | * 7/2002 | Oddo | ............................. 707/6 |

OTHER PUBLICATIONS

W.B. Frakes and R. Baeza–Yates, Information Retrieval: Data Structures and Algorithms, Prentice Hall, Englewood Cliffs, NJ, 1992.
R. Agrawal, J.C. Shafer, "Parallel Mining of Association Rules", IEEE Transactions on Knowledge and Data Engineering, vol. 8, No. 6, Dec. 1996.
S. Deerwester, S.T. Dumais, G.W. Furnas, T.K. Landauer, R. Harshman, "Indexing by Latent Semantic Analysis", Journal of the American Society for Information Science, 41(6), 391–407, 1990.
P.W. Foltz, "Using Latent Semantic Indexing for Information Filtering," In R.B. Allen (Ed.) Proceedings of the Conference on Office Information Systems, Cambridge, MA, 40–47, 1990. (http://www–psych.nmsu.edu/~pfoltz/cois/filtering–cois.html).
E. Savia, T. Kurki, and S. Jokela, "Metadata Based Matching of Documents and Use Profiles," *Proceedings of 8th Finnish Artificial Conference, Human and Artificial Information Processing,* pp. 61–69, 1998.
R. Srikant, R. Agrawal, "Mining Generalized Association Rules", Proc. of the 21st Int'l Conference on Very Large Databases, Zurich, Switzerland, Sep. 1995.

* cited by examiner

*Primary Examiner*—Sam Rimell
(74) *Attorney, Agent, or Firm*—McGinn & Gibb, PLLC; T. Rao Coca, Esq.

(57) ABSTRACT

The present invention relates to a method, system and computer program product for clustering data points and its application to text summarization, customer profiling for web personalization and product cataloging.

The method for clustering data points with defined quantified relationships between them comprises the steps of obtaining lead value for each data point either by deriving from said quantified relationships or as given input, ranking each data point in a lead value sequence list in descending order of lead value, assigning the first data point in said lead value sequence list as the leader of the first cluster, and considering each subsequent data point in said lead value sequence list as a leader of a new cluster if its relationship with the leaders of each of the previous clusters is less than a defined threshold value or as a member of one or more clusters where its relationship with the cluster leader is more than or equal to said threshold value. The said relationships between data points are symmetric or asymmetric. Similarly, system and computer program product have also been claimed.

66 Claims, 6 Drawing Sheets

CLUSTERING DATA INCLUDING THOSE WITH ASYMMETRIC RELATIONSHIPS

TECHNICAL FIELD OF INVENTION

This invention relates to clustering data points and its application to text summarization, customer profiling for web personalization and product cataloging.

BACKGROUND OF THE INVENTION

Clustering plays an important role in knowledge discovery and data mining, which are very useful in varied domains from biology to astronomy, and from medicine to Web mining. Traditionally, clustering is done on data sets, where the underlying relation R is defined between any two data points in the data set or is defined between any two points in the space containing the data points. The relation between two points is by default considered to be symmetric. However, there exist many data sets where the relation between any two points need not be symmetric. For example, consider a set of English sentences where the relation between two sentences reflects closeness of their meaning. Obviously, one sentence may subsume the meaning of the other sentence, may be equal to the other sentence in meaning, or may not at all relate to the meaning of the other sentence. (One more example of asymmetric relation is that between products—R(electronic toys, batteries) !=R (batteries, electronic toys); R(Levi's jeans, Wrangler jeans) !=R(Wrangler jeans, Levi's jeans).) Thus, there exist many examples in which the relation is not symmetric and one needs to mine the data under such circumstances.

Text summarization tools work on a single document or a collection documents and generate text of shorter length that summarize the input. These summaries are useful in knowing the contents of the documents without actually reading the whole documents. This may in turn help in judging the relevance of a document or a collection of documents. Most of the text summarization methods rank individual blocks of the input text such as sentences, and paragraphs, based on different criteria and summarize the text with the highly ranked blocks. The number of blocks of text that is output by these methods is either fixed or may be specified by the user. The blocks are ranked based on various criteria viz., block's position in the document, semantic content of the block, and block's similarity with the entire document. See for example, "US 05867164—Interactive Document Summarization," "US 05638543—Method and apparatus for automatic document summarization," "US 05963969—Document abstraction system and method thereof." There are some tools that are specific to the domain of documents. They construct a summary by finding the occurrence of certain phrases in the document.

Information retrieval and filtering systems most often work with a set of keywords called a dictionary. These keywords are generally obtained from a set of documents related to the system's domain of application. The performance of the systems critically depends on the selection of keywords and their usage. Organization of the keywords, viz., vocabulary organization, involves imposing a hierarchical structure on the keywords. The structure of hierarchy is dependent on how the organization is used. There are many uses of organized vocabulary. Vocabulary organization can be done such that the keywords corresponding to children of a node are conceptually independent yet they are all related to their parent node. This kind of organization addresses the problem commonly encountered by information systems viz., the one caused due to representing closely related concepts as independent concepts [Foltz 1990, Deerwester et. al. 1988, Savia et. al. 1998, Frakes et. al. 1992—Chapter 9]. In [Foltz 1990, Deerwester et. al. 1988], a set of orthogonal combination of keywords are extracted and used for retrieval and filtering. In [Frakes et. al. 1992], a hierarchy is formed based on the frequencies and density functions of various keywords. In [Savia et. al. 1998], a hierarchy structure on the keywords is assumed and is used for representing user profiles as well as documents for information retrieval. The other use of vocabulary organization could be to summarize a collection of documents using a hierarchy of keywords that reflect their distribution among the documents.

Arrangement of products in a physical or electronic store crucially decides the comfort of a visiting customer in finding the products she needs and hence her future visits to the stores. Therefore, products in an ideal physical or electronic store should be arranged such that any customer visiting the store finds the products she needs with minimal search effort. Designing a store involves arranging various products within the store. Traditionally, store design is done by experts who have an understanding of the needs of the customers as well as knowledge about all the products in the store. As the number of products and the number of customers increase (which is very much true in case of electronic stores), designing a store by an expert becomes difficult. The sources of information that can be used to automate the designing of a store are the data relating to different attribute values of the products in the store and the data on purchase history of the customers. Data mining methods are employed to derive association rules between various products in the stores using the customer purchase history [Agrawal et. al. 1996, Srikant et. al. 1995]. These methods result in associations between a subset of products. For example, "people buying wine also buy milk and bread." Store designers use these association rules to design a store. These can be particularly useful in case of physical stores where it is sufficient to mine the data for some major categories of items. In an electronic store, where there is no restriction on the physical layout of the store, one can mine for rules containing any number of items and use them to design the store. One of the embodiments of the present invention can be used to automatically generate a hierarchy of important products in a store and thus design the store at an item level rather than product category level. Apart from designing the stores, these hierarchies are useful also in analyzing the key selling items in the store. Store design can also be done using various attributes of the products in the store. To automatically find a hierarchy of products based on this data, one needs to know the similarity or dissimilarity between any two products in the store. Typically, these similarity relations are asymmetric.

THE OBJECTS AND SUMMARY OF INVENTION

The object of this invention is clustering data points wherein the relationship between the data points is symmetric or asymmetric.

Further, object of the invention is summarizing a single or a collection of documents.

Another object of the present invention is to provide vocabulary organization, construction of summary for a single document or a collection of documents and customer profiling.

Yet another object of the invention is store designing, and customer segmentation.

The present invention formulates the problem of clustering a data set under a relation that is asymmetric, and describes a method to cluster the data under the proposed formulation. The clustering problem is posed as the problem of finding minimal number of mutually distinct data points such that all the points in the data set are sufficiently close to at least one of the distinct data points, and then, extracting subsets of the data set by associating each distinct point with points that are close to it. The method contains two steps. In the first step, the data points are evaluated for their ability to lead a cluster. We call this evaluation as the lead value of the data point. This evaluation may depend on the underlying relation or may be very specific to the data under consideration. The second step consists of actually finding the distinct data points and the associated subset given the lead values of the data points and the relation. In this invention, we also describe different variants of the invented method that are useful in text summarization, vocabulary organization, customer profiling, store design and customer segmentation.

Text summarization method in the present invention can be applied to summarize a single document or a collection of documents. The method finds blocks of the input text that are distinct and yet capture all the contents of the input. In general, these blocks could be sentences, collections of sentences, paragraphs, or subparagraphs. When applied to a collection of documents, summaries of individual documents can also be considered as a block. The block $d_i$ is related to a block $d_j$ by a number that reflects inclusion of the meaning of $d_j$ in the meaning of $d_i$. Lead value of a block is decided by the effective number (detailed below) of times each block appears in the collection of blocks. The above mentioned method can be applied using the above lead-values and the relation to cluster the collection of blocks. The collection of distinct blocks forms a summary of the input text. It may be noted that each cluster can further be clustered into sub-clusters to organize the data in a hierarchy and each node in the hierarchy is associated with a block that summarizes all the blocks in the node. A summary of variable length can be obtained by taking the representative blocks of some of the appropriately selected nodes in the hierarchy.

The objective of vocabulary organization in automatically generated dictionaries is to impose a hierarchical structure on the words in the vocabulary indicating term classes. The invented method can also be applied to generate such a hierarchy structure on the words. In this case, each word represents a data point and a word $d_i$ is related to a word $d_j$ by the percentage of documents containing $d_j$ that also contain $d_i$. The tf*idf (explained in detail below) of a word could be its lead value. Another lead value could be the frequency of a word. Using the lead value and the mentioned relation, the invented method can organize the words in a hierarchy.

One of the embodiments of the invention can be used to form a hierarchy of products that meet different objectives using various types of data. The products are considered as data points in this context. If the clustering is done using the customer purchase history, the lead value of a product could be a combination of different parameters associated with it, for example per unit price, per unit profit, and number of items sold. The relation of the product $d_i$ with the product $d_j$ could be the percentage of times customers bought product $d_j$ after buying product $d_i$. Given one of the above lead values and the above relation, the invented method results in a hierarchy of products. Similarly, if the clustering is done using the attributes of the products, the lead value of a product could be a combination of different parameters associated with it, for example per unit price, and per unit profit. The relation could be any that is defined by a user of the system.

Accordingly, the present invention provides a method for clustering data points with defined quantified relationships between them comprising the steps of:

obtaining lead value for each data point either by deriving from said quantified relationships or as given input, ranking each data point in a lead value sequence list in descending order of lead value, assigning the first data point in said lead value sequence list as the leader of the first cluster, and considering each subsequent data point in said lead value sequence list as a leader of a new cluster if its relationship with the leaders of each of the previous clusters is less than a defined threshold value or as a member of one or more clusters where its relationship with the cluster leader is more than or equal to said threshold value.

The said relationships between data points are symmetric or asymmetric.

The lead value of each data point is determined by taking the sum of relation values of each of the other data points to said data point.

The said threshold value is adaptively found for a given number of clusters.

A method for organizing a set of data points into an hierarchy of clusters wherein the above method is first used to cluster the data points into sets of small sizes, each smaller set is further subclustered using the method and subclustering is repeated until a terminating condition is reached.

The above method is applied to text summarization of a single document or a collection of documents comprising the steps of:

segmenting the given input text into blocks such as sentences, a collection of sentences, paragraphs, excluding words belonging to a defined list of 'stop' words, replacing words by their unique synonymous word, if it exists, from a given a collection of synonyms, application of stemming algorithms for mapping words to root words, representing the resulting blocks of text, with respect to a dictionary which is either given or computed from the input text, by a binary vector of size equal to the number of words in the dictionary whose ith element is 1 if ith word in the dictionary is present in the block, computing the relationship between any data points di and dj by evaluating $R(di,dj)=|dj.Tdi|/|dj|$ wherein T is a thesaurus matrix whose ijth element reflects the extent of inclusion of meaning of jth word in the meaning of ith word, and clustering the data points wherein the lead value of each data point is determined by taking the sum of relation values of each of the other data points to said data point, the threshold value is adaptively found for a given number of clusters and the set of leaders of the resulting clusters summarize the given text.

The said dictionary is computed by taking the fraction of words, excluding the stop words, with highest tfidf value, which is given by:

$$tfidf(wi)=tfi*\log(N/dfi)$$

where tfidf(wi) is the lead value of data point wi, tfi=the number of times the data point wi occurred in the whole text, dfi=the number of documents containing the data point wi and N=the total number of documents in the text.

The said thesaurus matrix is either a given, identity matrix or computed from a collection of documents.

Each block is represented by a vector whose ith element represents the frequency of occurrence of ith word in the block.

A method for organizing a set of text documents into an hierarchy of clusters wherein the above method is first used to cluster the given documents into sets of small sizes, each smaller set is further subclustered using the method and subclustering is repeated until a terminating condition is reached.

The above method is also applied to organize the results returned by any information retrieval system in response to a user query into an hierarchy of clusters.

The hierarchy is used to aid the user in modifying his/her query and/or in browsing through the results.

The information retrieval system is any search engine retrieving Web documents.

The above method is applied to vocabulary organization for a group of documents wherein the data points are the words in the dictionary of the vocabulary, the lead value of a word is either its frequency of occurrence in the collection, the number of documents containing the word or its tfidf value, the relationship R(di,dj) denotes the fraction of documents containing the jth word that also contain ith word, and the clustering produced by the application of the method results in a structured hierarchical organization of the vocabulary.

The structured vocabulary is used to provide text summarization for the associated documents.

The above method is applied to customer profiling wherein the dictionary is built and the vocabulary is organized using the documents that are viewed by the customer.

The data points correspond to the products cataloged in the store, the lead value of a product is its per unit profit, its per unit value or the number of items sold per unit time, and the relationship between the products is either explicitly defined or derived from the purchase data.

The product di is related to the product dj by the fraction of customer transactions containing dj that also contain di.

The above method is applied to analyze sales of a store for the merchant or to organize the layout of the store to facilitate easy access to products.

The above method is further applied to personalize the electronic store layout to an individual customer by using the relationship that is specific to the customer.

The above method is also applied to customer segmentation for a sales or service organization wherein the data points are the customers in the data base, the lead values are their total purchase amount per unit time, their income, the number of times customers visited the store, or the number items bought by the customer, the relationship between customers is either explicitly defined or derived from some relevant data, with the resulting clustering reflecting a structured grouping of customers with similar performances.

The customer di is related to the customer dj by the fraction of products bought by dj that are also bought by di.

The present invention further provides a system for clustering data points with defined quantified relationships between them comprising:

means for obtaining lead value for each data point either by deriving from said quantified relationships or as given input, means for ranking each data point in a lead value sequence list in descending order of lead value, means for assigning the first data point in said lead value sequence list as the leader of the first cluster, and means for considering each subsequent data point in said lead value sequence list as a leader of a new cluster if its relationship with the leaders of each of the previous clusters is less than a defined threshold value or as a member of one or more clusters where its relationship with the cluster leader is more than or equal to said threshold value.

The said relationships between data points are symmetric or asymmetric.

The means for obtaining lead value of each data point is by taking the sum of relation values of each of the other data points to said data point.

The said threshold value is adaptively found for a given number of clusters.

The above system for organizing a set of data points into a hierarchy of clusters wherein the above system is first used to cluster the data points into sets of small sizes, each smaller set is further subclustered using the system and subclustering is repeated until a terminating condition is reached.

The above system is used for text summarization of a single document or a collection of documents comprising:

means for segmenting the given input text into blocks such as sentences, a collection of sentences, paragraphs, means for excluding words belonging to a defined list of 'stop' words, means for replacing words by their unique synonymous word, if it exists, from a given collection of synonyms, means for applying stemming algorithms for mapping words to root words means for representing the resulting blocks of text, with respect to a dictionary which is either given or computed from the input text, by a binary vector of size equal to the number of words in the dictionary whose ith element is 1 if ith word in the dictionary is present in the block, means for computing the relationship between any data points di and dj by evaluating $R(di,dj)=|dj.Tdi|/|dj|$ wherein T is a thesaurus matrix whose ijth element reflects the extent of inclusion of meaning of jth word in the meaning of ith word, and means for clustering the data points wherein the lead value of each data point is determined by taking the sum of relation values of each of the other data points to said data point, the threshold value is adaptively found for a given number of clusters and the set of leaders of the resulting clusters summarize the given text.

The said dictionary is computed by taking the fraction of words, excluding the stop words, with highest tfidf value, which is given by means of:

$$tfidf(wi)=tfi*\log(N/dfi)$$

where tfidf(wi) is the lead value of data point wi, tfi=the number of times the data point wi occurred in the whole text, dfi=the number of documents containing the data point wi and N=the total number of documents in the text.

The said thesaurus matrix is either a given identity matrix or computed from a collection of documents.

Each block is represented by a vector means whose ith element represents the frequency of occurrence of ith word in the block.

A system for organizing a set of text documents into a hierarchy of clusters wherein the above system is first used to cluster the given documents into sets of small sizes, each smaller set is further subclustered using the system and the subclustering is repeated until a terminating condition is reached.

The above system is used to organize the results returned by any information retrieval system in response to an user query into an hierarchy of clusters.

The hierarchy of clusters is used to aid the user in modifying his/her query and/or in browsing through the results.

The information retrieval system is any search engine retrieving Web documents.

The above system is used for vocabulary organization for a group of documents wherein the data points are the words in the dictionary of the vocabulary, the lead value of a word is either its frequency of occurrence in the collection, the number of documents containing the word or its tfidf value, the relationship R(di,dj) denote the fraction of documents containing the jth word that also contain ith word, and the clustering produced by the system results in a structured hierarchical organization of the vocabulary.

The structured vocabulary organization is used to provide text summarization for the associated documents.

The above system is used for customer profiling wherein the dictionary is built and the vocabulary is organized using the documents that are viewed by the customer.

The data points correspond to the products cataloged in the store, the lead value of a product is its per unit profit, its per unit value or the number of items sold per unit time, the relationship between the products is either explicitly defined or derived from the purchase data.

The product di is related to the product dj by the fraction of customer transactions containing dj that also contain di.

The above system is used for analyzing sales of a store for the merchant or for organizing the layout of the store to facilitate easy access to products.

The above system is further used to personalize the electronic store layout to an individual customer by using the relationship that is specific to the customer.

The said system is used for customer segmentation for a sales or service organization wherein the data points are the customers in the data base, the lead values are their total purchase amount per unit time, their income, the number of times customers visited the store, or the number items bought by the customer, the relationship between customers is either explicitly defined or derived from some relevant data, with the resulting clustering reflecting a structured grouping of customers with similar performances.

The customer di is related to the customer dj by the fraction of products bought by dj that are also bought by di.

The instant invention further provides a computer program product comprising computer readable program code stored on computer readable storage medium embodied therein for clustering data points with defined quantified relationships between them, comprising:

computer readable program code means configured for obtaining lead value for each data point either by deriving from said quantified relationships or as given input, computer readable program code means configured for ranking each data point in a lead value sequence list in descending order of lead value, computer readable program code means configured for assigning the first data point in said lead value sequence list as the leader of the first cluster, and computer readable program code means configured for considering each subsequent data point in said lead value sequence list as a leader of a new cluster if its relationship with the leaders of each of the previous clusters is less than a defined threshold value or as a member of one or more clusters where its relationship with the cluster leader is more than or equal to said threshold value.

The said relationships between data points are symmetric or asymmetric.

The said computer readable program code means configured for obtaining lead value of each data point is by taking the sum of relation values of each of the other data points to said data point.

The said threshold value is adaptively found for a given number of clusters.

A computer program product for organizing a set of data points into an hierarchy of clusters wherein above computer program product is first used to cluster the data points into sets of small sizes, each smaller set is further subclustered using the computer program product and the subclustering is repeated until a terminating condition is reached.

The above computer program product is configured for text summarization of a single document or a collection of documents comprising:

computer readable program code means configured for segmenting the given input text into blocks such as sentences, a collection of sentences, paragraphs, computer readable program code means configured for excluding words elonging to a defined list of 'stop' words, computer readable program code means configured for replacing words by their unique synonymous word, if it exists, from a given a collection of synonyms, computer readable program code means configured for applying stemming algorithms for mapping words to root words, computer readable program code means configured for representing the resulting blocks of text, with respect to a dictionary which is either given or computed from the input text, by a binary vector of size equal to the number of words in the dictionary whose ith element is 1 if ith word in the dictionary is present in the block, computer readable program code means configured for computing the relationship between any data points di and dj by evaluating $R(di,dj)=|dj.Tdi|/|dj|$ wherein T is a thesaurus matrix whose ijth element reflects the extent of inclusion of meaning of jth word in the meaning of ith word, and computer readable program code means for clustering the data points wherein the lead value of each data point is determined by taking the sum of relation values of each of the other data points to said data point, the threshold value is adaptively found for a given number of clusters and the set of leaders of the resulting clusters summarize the given text.

The said dictionary is computed by taking the fraction of words, excluding the stop words, with highest tfidf value which is given by:

$$tfidf(wi)=tfi*\log(N/dfi)$$

where tfidf(wi) is the lead value of data point wi, tfi=the number of times the data point wi occurred in the whole text, dfi=the number of documents containing the data point wi and N=the total number of documents in the text.

The said thesaurus matrix is either a given identity matrix or computed from a collection of documents.

Each block is represented by a vector computer readable program code means, whose ith element represent the frequency of occurrence of ith word in the block.

The above computer program product for organizing a set of text documents into a hierarchy of clusters wherein the above computer program product is first used to cluster the given documents into sets of small sizes, each smaller set is further subclustered using the computer program product and the subclustering is repeated until a terminating condition is reached.

The above computer program product is configured for organizing the results returned by any information retrieval system in response to an user query into an hierarchy of clusters.

The hierarchy of clusters is used to aid the user in modifying his/her query and/or in browsing through the results.

The information retrieval system is any search engine retrieving Web documents.

The above computer program product is configured for vocabulary organization for a group of documents wherein the data points are the words in the dictionary of the vocabulary, the lead value of a word is either its frequency of occurrence in the collection, the number of documents containing the word or its tfidf value, the relationship R(di,dj) denote the fraction of documents containing the jth word that also contain ith word, and the clustering produced by the computer readable program code means results in a structured hierarchical organization of the vocabulary.

The structured vocabulary organization is used to provide text summarization for the associated documents.

The said computer program product is configured for customer profiling wherein the dictionary is built and the vocabulary is organized using the documents that viewed by the customer.

The data points correspond to the products cataloged in the store, the lead value of a product is its per unit profit, its per unit value or the number of items sold per unit time, the relationship between the products is either explicitly defined or derived from the purchase data.

The product di is related to the product dj by the fraction of customer transactions containing dj that also contain di.

The above computer program product is configured for analyzing sales of a store for the merchant or for organizing the layout of the store to facilitate easy access to products.

The said computer program product is also configured for personalizing the electronic store layout to an individual customer by using the relationship that is specific to the customer.

The said computer program product is further configured for customer segmentation for a sales or service organization wherein the data points are the customers in the data base, the lead values are their total purchase amount per unit time, their income, the number of times customers visited the store, or the number items bought by the customer, the relationships between customers is either explicitly defined or derived from some relevant data, with the resulting clustering reflecting a structured grouping of customers with similar performances.

The customer di is related to the customer $d_j$ by the fraction of products bought by $d_j$ that are also bought by di.

BRIEF DESCRIPTION OF THE DRAWINGS

The invention will now be described with reference to the accompanying drawings.

DETAILED DESCRIPTION OF THE DRAWINGS

We first precisely define the problem under consideration before explaining the method and its variants. We will also describe embodiments of these variants of the invented method.

Problem Definition: Given a data set $P=\{d_1, d_2, \ldots d_N\}$, a relation $R:D \times D$ [0,1], and a number $\eta$, the objective is to find a subset S of D satisfying the following:

1.1. Each element $s_i \in S$ is associated with a set $C_i$, such that $d_j \in C_i$ if $R(d_j, s_i) < \eta$, 2.2. for all $d_j$, $\min_i R(d_j, s_i) < \eta$, 3.3. $s_i$ are as distinct as possible, and 4.4. the cardinality of S is as small as possible.

One can build a hierarchy, H, on D by clustering the sets $C_i$ further.

Weighted Directed Graph of a Relation (Shown in FIG. 1): Let $D=\{d_1, d_2, \ldots d_N\}$ be the data set and R be a relation on D. The weighted directed graph (WDG) associated with the relation R is the graph in which the vertices represent $d_i$ and the edge from $d_j$ to $d_i$ has weight $R(d_i, d_j)$. In case of multiple instances of same data point in D, the above graph contains vertices corresponding to unique points in D and each vertex is associated with the frequency of the data point in D. Without loss of generality, let D represent the set of unique data points and $f_i$ be the frequency of $d_i$.

EXAMPLE 1

Let D contain six elements each with frequency one and let R be represented as in the following matrix.

| 1.0  | 0.8  | 0.0 | 0.0 | 0.0 | 0.3 |
|------|------|-----|-----|-----|-----|
| 0.25 | 1.0  | 0.2 | 0.0 | 0.0 | 0.0 |
| 0.0  | 0.85 | 1.0 | 0.2 | 0.0 | 0.0 |
| 0.0  | 0.0  | 0.3 | 1.0 | 0.4 | 0.9 |
| 0.0  | 0.0  | 0.0 | 0.5 | 1.0 | 0.8 |
| 0.0  | 0.25 | 0.0 | 0.0 | 0.3 | 1.0 |

Figure 1:
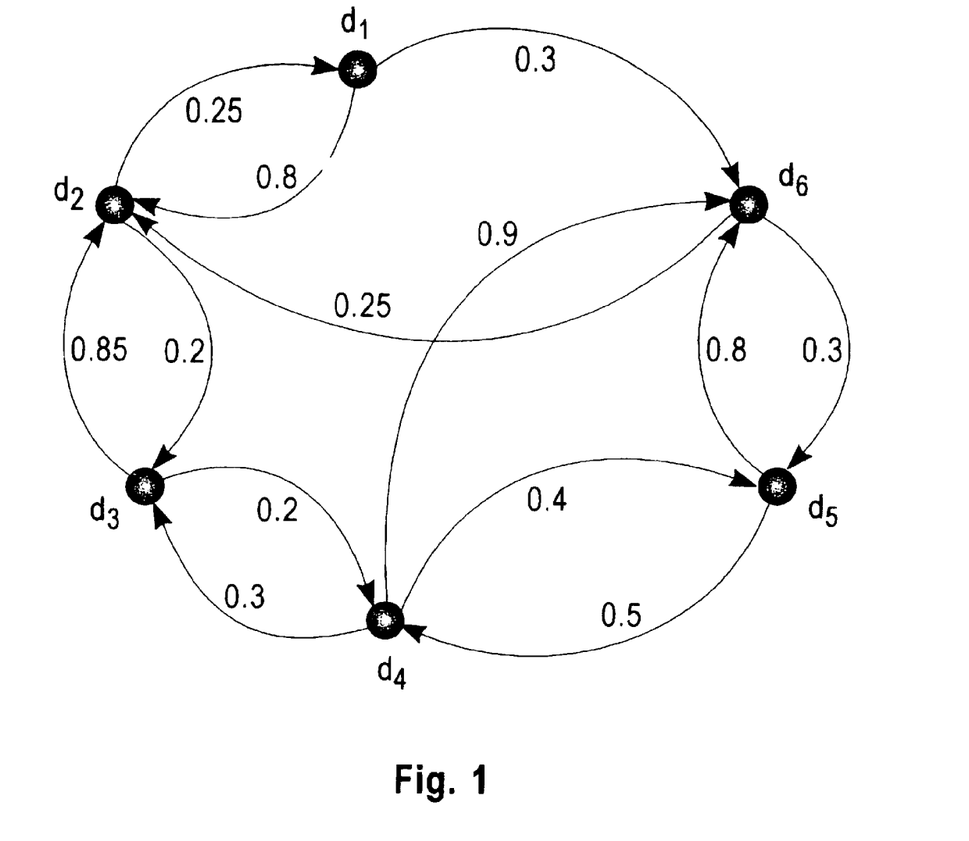
FIG. 1 shows the weighted directed graph of example 1.

The associated graph is shown in FIG. 1.

The Method: The method schematically presented in FIG. 2. The method first computes the lead values of data points. The lead value of each data point may depend on the underlying relation or may be very specific to the data under consideration. In general, the sum of relation values of each of the other data points to the data point, viz. the in-degree of the corresponding vertex may be a good lead value.

Figure 2:
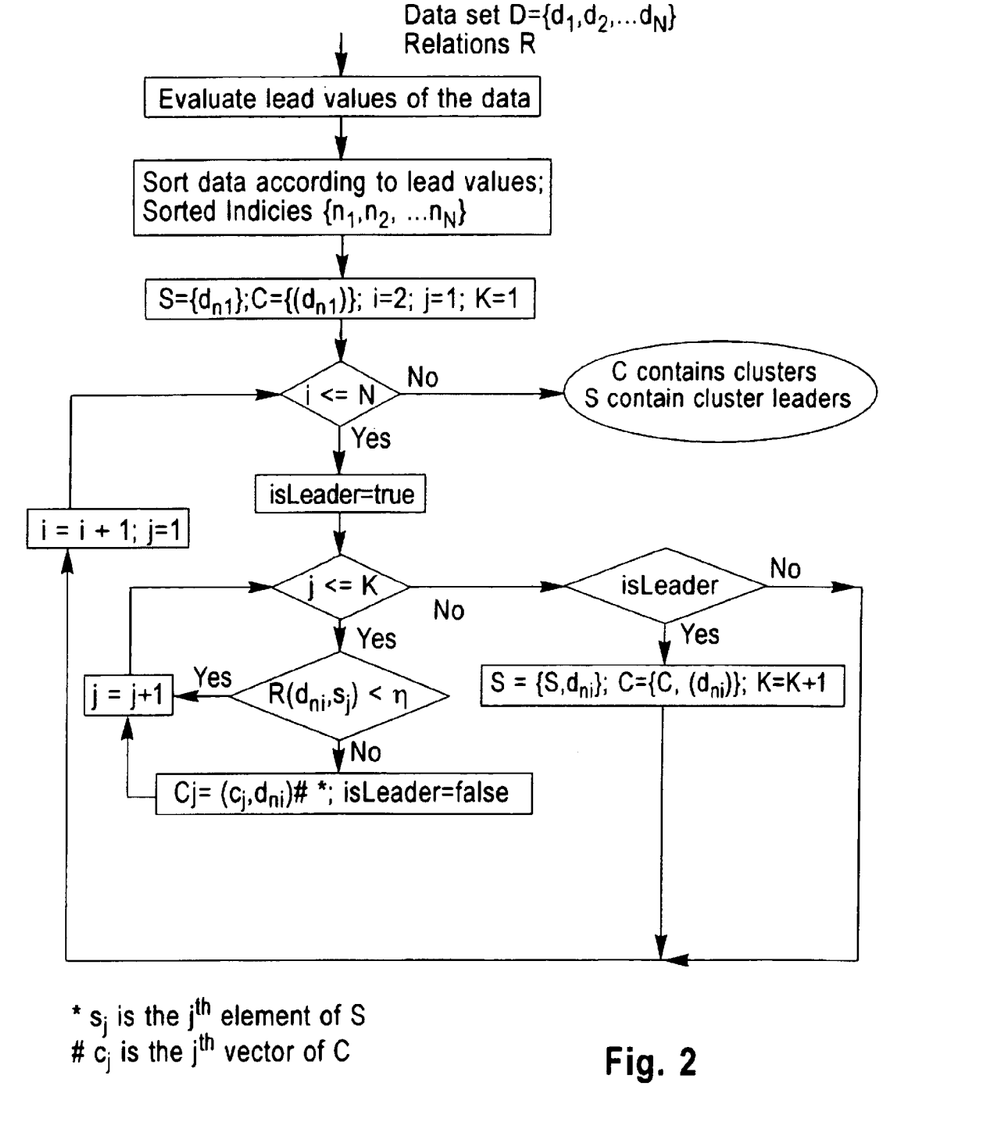
FIG. 2 shows schematic diagram of the method, according to this invention.

The method identifies the distinct data points based using these lead values and the underlying relation. The set of distinct points S, is built by considering the data points in the descending order of their lead values. The first point in the order is added to S. Then, the next point is added to S if none of the points already in S are close to the point. A pseudo-code for the method is given below.

Pseudo-Code:
1. Compute the lead value of each data point in D.
2. Sort data points in the decreasing order of their lead values. Let the sorted index set I={n1, n2, . . . ,nN}.
3. Initialize S. Let A be an array of vectors of variable length. The first element in each vector represents the index of an element in S and the rest of the vector represents indices of elements in $C_i$. Denote ith elements of A by $a_i$ and j the element of S by $s_j$. Let A=[(n1)], S={$s_1$}={$d_{n1}$}, and i=2.
4. Build S.

```
while i < N,{
  isLeader=true;
    forj = 1 to |S|,{ //|S| - cardinality of S
      if(R(d_ni, s_j) < n) {
        a_j = (a_j, ni);
        isLeader = false;
      }
    }
    if(isLeader) {
      A = [A,(ni)];
      S = SU {d_ni};
    }
    i = i + 1;
}
```

EXAMPLE 1 (Continued)

Figure 3:
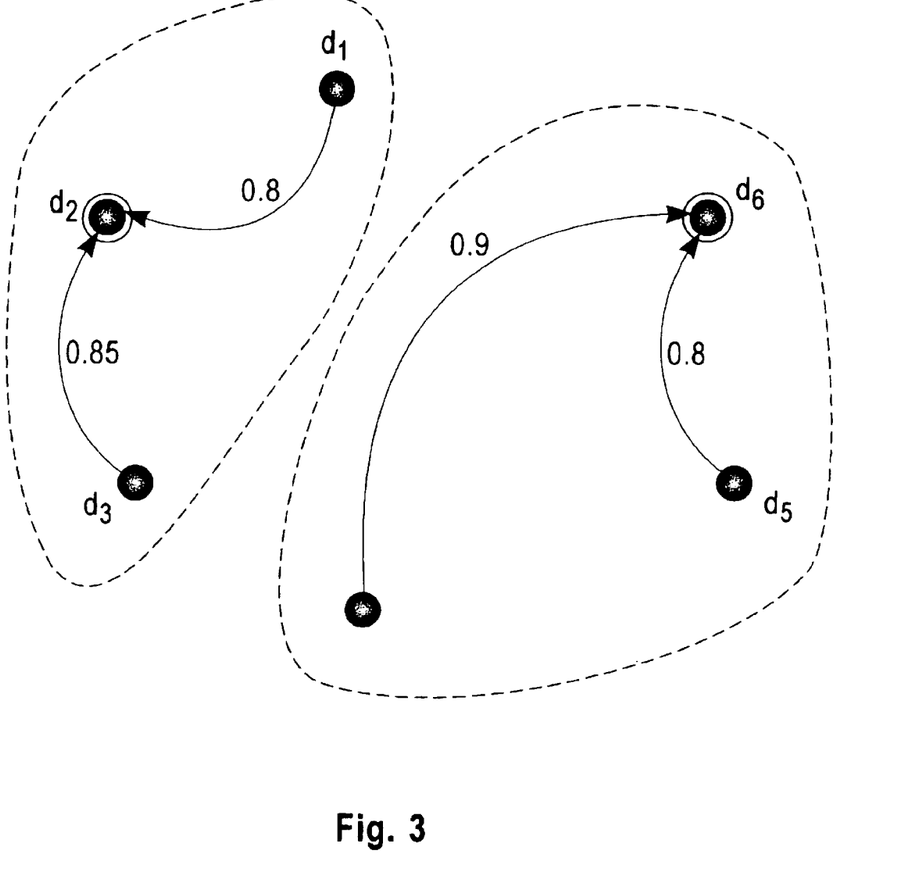
FIG. 3 shows the resultant graph after the method is applied to the data in example 1.

FIG. 3 shows the cluster obtained by applying the above method on Example 1 for η=0.5. Lead Values for $d_1$, $d_2$, . . . , and $d_6$ are 1.25, 2.9, 1.5, 1.7, 1.7, and 2.7, respectively. Therefore, the first distinct element is $d_2$, i.e., S={$d_2$}. Then, since $R(d_6,d_2)<0.5$, S={$d_2,d_6$}. Since for i=1, 3, 4, and 5, $d_1$ is closer than 0.5 to either $d_2$ or $d_6$, S={$d_2,d_6$}, $C_1$={2, 1, 3} and $C_2$={6, 4,5}.

Text Summarization: A variant of the above method can be used for text summarization. This variant segments the input text into blocks and finds a set of blocks that are mutually distinct in terms of their content and yet cover the contents of the entire text, thus producing a summary of the input. Each block could be a sentence, a collection of sentences, a paragraph, or a collection of paragraphs. The method processes each block and represents it in a uniform way. This processing contains several steps and uses a dictionary of words. The dictionary of words could be either prefixed or built from the input text. There are several ways to build a dictionary [Frakes et. al. 1992, Salton et. al. 1983]. One of the ways to build a dictionary for a given collection of documents is to consider the top K number of words with highest tf*idf value, where K is a fixed number and tf*idf is defined as:

$$tf\text{*}idf(w_i)=tf_i\text{*}\log(N/df_i) \quad (2)$$

In the above equation, $tf_i$ is the number of times the word $w_i$ occurred in the whole collection, $df_i$ is the number of documents containing the word $w_i$ and N is the total number of documents in the collection.

Figure 4:
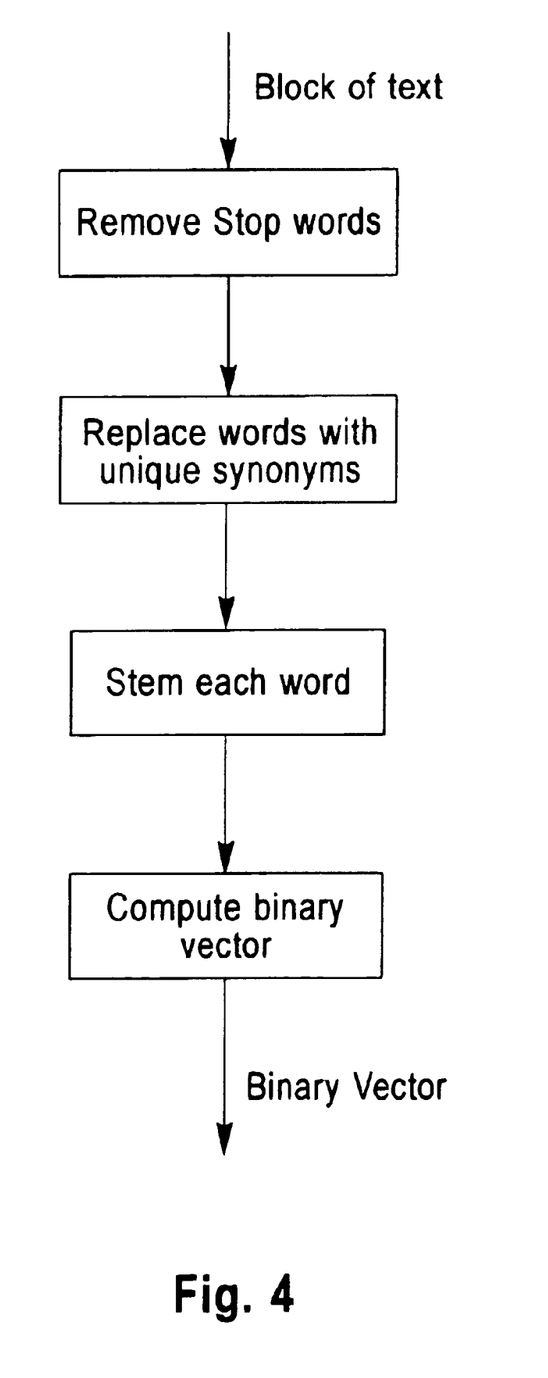
FIG. 4 shows the schematic diagram of converting test blocks to binary vectors.

The following sequence steps which are schematically shown in FIG. 4 constitutes a way to uniformly represent a block by a binary vector for a given dictionary W={$w_1$, $w_2$, . . . , $w_K$}:
1. Stop words are removed from the blocks. The list of stop words could be pre-specified and/or computed using tf*idf value of each keyword.
2. Given a collection of synonyms, viz., a mapping from many synonymous words to a unique word, each word in the block, if it has a synonym, is replaced by its unique synonym.
3. A stemming algorithm is applied to each word to map it to its root word. For example, "replicating", and "replicated" are mapped to "replicate".
4. Finally, the block is represented by a vector of dimension K whose i th element is 1 if the block contains $w_i$, otherwise it is equal to 0.

Let N be the total number of blocks in the input text and D={$d_1$, $d_2$, . . . $d_N$} represents the set of binary vectors associated with the blocks. Now the relation between any two data points should reflect the extent of inclusion of meaning of one in the other. To capture this, one needs to know the extent of inclusion of meanings of one word in the another word, One can use a thesaurus for this purpose. Thesaurai can be constructed manually or automatically {Frakes et. al. 1992}. Let T be a thesaurus where $t_{ij}$ is the extent of meaning of $w_j$ included in the meaning of $w_i$. If nothing is known about the words, T becomes an identity matrix, implying no word is related to any other word. Then, the relation R is defined as follows:

$$R(d_i,d_j)=|d_j \cdot T\ d_i|/|d_j|, \quad (3)$$

where |a| is the element sum of the vector a and a.b is the dot product of a and b. The invented text summarization method uses R as defined in (3) along with the lead values as defined in (1) to cluster the set D. The method summarizes the contents of the input by the blocks corresponding to the data points in the set S resulting from the clustering algorithm proposed in this invention. Each block in the summary can be ranked by the in-degree of the corresponding data point in $D_1$ which reflects an effective number occurrences of the block in the input text.

Figure 5:
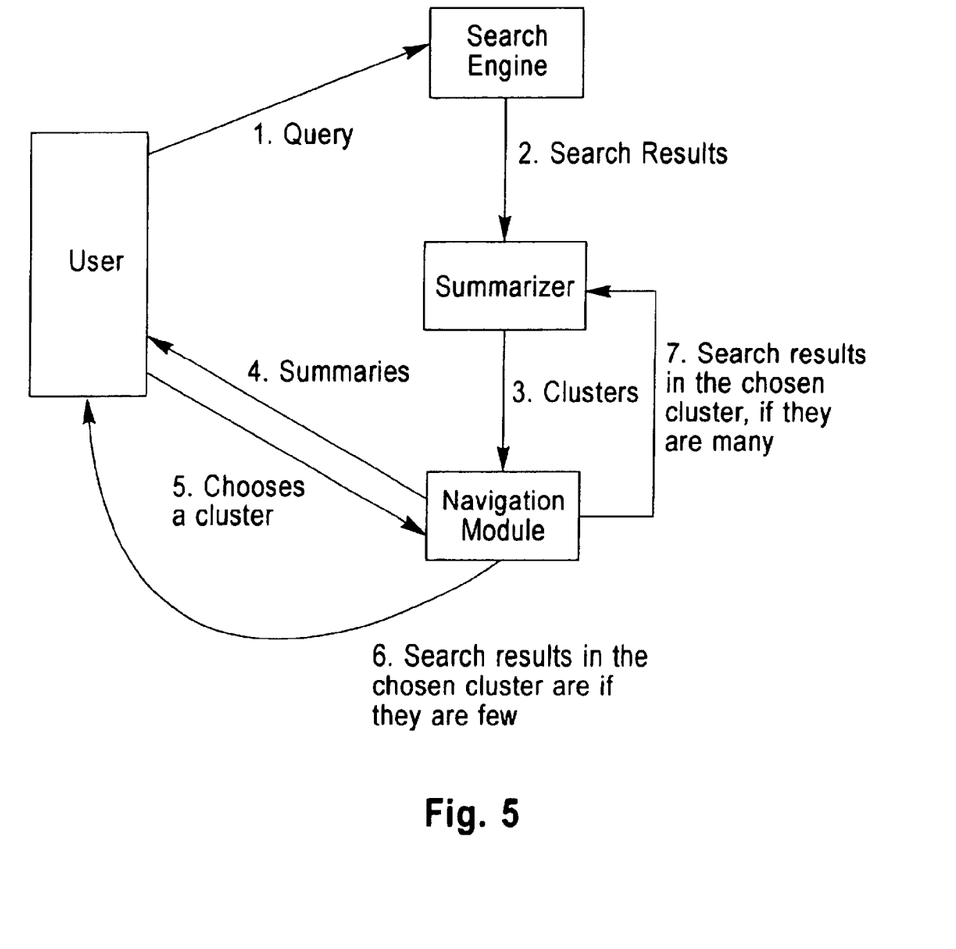
FIG. 5 shows user interaction with clusters of web results

One embodiment of the above method can be used to cluster Web results where T can be either obtained from Wordnet (http://www.wordnet.com) like software or computed from a collection of documents. In many cases, search engines over the web return thousands of links containing a given query. Going through these many links to discover a relevant one would be quite tiresome and many times this may cause the user of a search engine to quit his search. Summarization is helpful in solving the above-mentioned problem. Let the set D consist of vectors representing the search results. Typically D consists of a titles of Web pages and small "snippets" describing the contents of the Web pages, returned by a search engine in response to a query. These results are clustered using the invented method resulting in S. Since the elements in S reflect the kind of documents each cluster contains, user is shown the elements of S. When the user chooses an element from S, then the elements in the corresponding $C_i$ are shown to the user if the number of documents in the cluster is less than a preset threshold. Otherwise, this cluster is further sub-clustered and the resulting S is shown to the user. This process is schematically shown in FIG. 5.

The above principle can also be used to refine a query submitted to a database of text documents. When a user selects an element of S in the interactive navigation, a subset of keywords belonging to the cluster corresponding to the selected element of S can be added to the query to augment it. The augmented query can be used to obtain to get a set of fresh results from the search engine.

Figure 6:
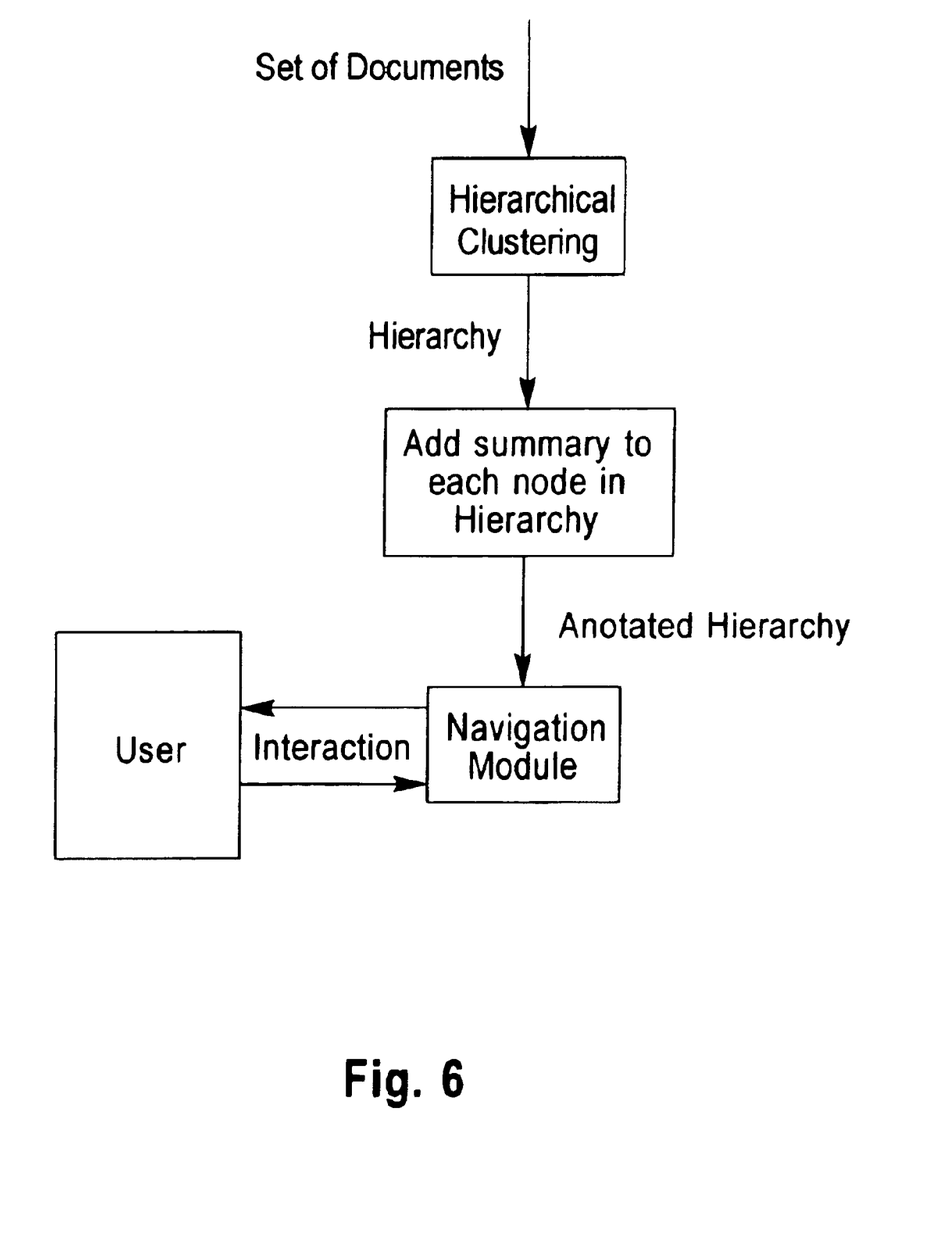
FIG. 6 shows dialog-based navigation through a collection of documents

The other application of the invented summarization method is in dialogue based navigation through a collection of text documents. One of the ways of searching and/or browsing through collection of text documents is through a dialogue based navigation. To start with, the collection of text documents is organized in the form of hierarchical clusters based on a certain criterion. The organization is done such that documents in a node in the hierarchy are related to each other. The user interacts with a navigational system through a dialog. At every instance, the user's query is parsed and mapped to a node in the hierarchy and a reflection is generated based on the contents of the node. The mapping from the query to a node can be based on the content of the present and/or previous queries and/or the node visited in the previous instance. For example, the node can be one of the children of the previous node that best matches the present query w. r. t. a certain criterion. The invented method can be used to generate summaries of each node in the hierarchy. Meaningful reflections are created using the summary of the visiting node. The block diagram of the underlying process is shown in FIG. 6.

Vocabulary organization in automatically generated thesauri: The objective is to impose a hierarchical structure on the words in the vocabulary indicating term classes. Let D be the set of words under consideration at the root of the hierarchy. We describe the algorithm using a specific embodiment of the invented method. Let $R(d_i, d_j)$ denote the fraction of documents containing word $d_j$ that also contain $d_i$. Note that R is computed with respect to a given set of documents. Let the lead value of word wi (di) be the tf*idf value of wi as given in (2). The lead value could also be the frequency of the word's occurrence in the collection of documents. Using one of the lead values and the above mentioned R the invented method shown in FIG. 2 is applied to cluster the set of words D. Then, the resulting S contains the words corresponding to the child nodes of the root. $C_i$ now represents a list of words at the corresponding child node. Every child node $C_i$ can be further sub-clustered using the documents that contain the word $s_i$. Thus, constructed hierarchy of words imposes an organization on the vocabulary.

When the lead value of a word is the frequency of the word in the collection of documents, the resulting hierarchy summarizes the collection of documents reflecting the distribution of words among the collection. When the lead value is tf*idf, the resulting hierarchy is such that the words corresponding to children of a node are distinct. This hierarchy is very useful in information retrieval and filtering when incorporated in representing the documents.

Customer profiling by a hierarchy of words: Recently, there have been studies that look into representing customer profiles as a hierarchy of keywords [Savia et. al. 1998]. If a hierarchy of words is constructed based on the documents that an individual has visited then such a hierarchy can be used as a profile of the individual and that profile can be used for information filtering. Similar user profiles can also be used for generating product recommendations if the hierarchies are formed using the descriptions of the products that the user has purchased in the past.

Store design: We describe in detail the use of the invented method in the design of a physical or electronic store that meets certain objectives. The invented method can also be used to design a store to meet other objectives too, but one needs to modify the lead value and the relation appropriately. Let D in the invented method be the set of products. Let the problem under consideration be that of finding a hierarchy of products such that the child nodes of a node of the hierarchy represent the key products that are sold in terms of per unit profit. Then, the lead value of a product would be its per unit profit and the relation $R(d_i, d_j)$ reflects the certainty of customer buying product $d_j$ after buying product $d_i$. $R(d_i, d_j)$ can be estimated from the customer purchase history. If the invented method shown in FIG. 2 is applied on the product data along with the above defined lead value and $R_i$ the resulting set S represents the set of key products in the store and the corresponding $C_i$ contain the auxiliary products. The method can in turn be applied to each of the $C_i$ to further sub-cluster them. This process of sub-clustering can be continued till the clusters contain fewer than a pre-specified number of products.

A hierarchy of products can also be obtained from the detailed data on the products using the invented method. Even in this case, the lead value of each product is its unit price. We may assume that the relation between pairs of products is given, which is either explicitly defined by a shop designer or derived by a separate module and could be dependent on various attributes and features of the products.

Personalized store design: A personalized catalog of products can be obtained if one uses a relation that is specific to the customer and is either explicitly specified by the customer or learned from her navigational behavior on the store's Web site.

Customer segmentation: Here is an embodiment of the invented method to find customer segments using customer purchase history. Let D represent the set of customers to be segmented. The lead value of a customer could be a combination of the number of times she visited the store, money spent by the customer per visit, money spent on products belonging to a certain catagory, etc. The relation R(di,dj) is equal to the percentage of products bought by dj that have been bought by di. The hierarchy resulting from the application of the method shown in FIG. 2 would be such that, customers at child nodes of a parent node represent a typical set of customers who bought non-overlapping sets of products.

REFERENCES

1. William B. Frakes and Ricardo Baeza-Yates, Information Retrieval: Data Structures and Algorithns, Prentice Hall, Englewood Cliffs, N.J., 1992.
2. R. Agrawal, J. C. Shafer, "Parallel Mining of Association Rules", IEEE Transactions on Knowledge and Data Engineering, Vul. 8, No. 6, December 1996.
3. S. Deerwester, S. T. Dumais, T. K. Landauer, G. W. Fumas, and L. Beck, "Improving information Retrieval using Latent Semantic Indexing," *Proceedings of the 1988 annual meeting of the American Society for Information Science,* 1988.
4. P. W. Foltz, Using Latent Semantic Indexing for Information Filtering, In R. B. Allen (Ed.) Proceedings of the Conference on Office Information Systems, Cambridge, Mass., 40–47, 1990. (http://www-psych.nmsu.edu/~pfoltz/cois/filtering-cois.html)
5. E. Savia, T. Kurki, and S. Jokela, "Metadata Based Matching of Documents and Use Profiles," *Proceedings of 8th Finnish Artificial Conference, Human and Artificial Information Processing,* Pages 61–69, 1998.
6. R. Srikant, R. Agrawal, "Mining Generalized Association Rules", Proc. of the 21st Int'l Conference on Very Large Databases, Zurich, Switzerland, September 1995.

What is claimed is:

1. A method for text summarization produced by clustering data points with defined quantified relation values between them, said method comprising:

obtaining a lead value for each data point, wherein said lead value for each data point is calculated by taking a sum of all relation values input into said data point weighted by a frequency of occurrence associated with said data point, ranking each data point in a lead value sequence list in descending order of lead value, assigning a first data point in said lead value sequence list as a leader of a first cluster, considering each subsequent data point in said lead value sequence list as a leader of a new cluster if its relationship with leaders of each of the previous clusters is less than a defined threshold value or as a member of at least one cluster where its relationship with a cluster leader is at least equal to said threshold value, wherein the threshold value is adaptively found for a given number of clusters, and generating said text summarization of any of a single document and a collection of documents by segmenting a given text input comprising said data points into clusters, and forming a set of leaders of said clusters to represent said text summarization.

2. The method of claim 1, wherein said quantified relationships between data points are any of symmetric and asymmetric quantified relationships.

3. The method of claim 1, wherein said frequency of occurrence equals one.

4. The method of claim 1, further comprising identifying distinct data points using said lead values and said relation values between said data points.

5. The method of claim 1, further comprising organizing a set of data points into a hierarchy of clusters by clustering the data points into sets of small sizes, wherein each smaller set is further subclustered; and repeatedly subclustering said smaller set until a terminating condition is reached.

6. The method of claim 1, wherein said step of generating further comprises:

segmenting a given input text into blocks comprising sentences, a collection of sentences, and paragraphs, excluding words belonging to a defined list of defined stop words, replacing words by their existing unique synonymous word from a given a collection of synonyms, applying stemming algorithms for mapping words to root words, representing resulting blocks of text, with respect to a dictionary which is either given or computed from the input text, by a binary vector of size equal to the number of words in the dictionary whose ith element is 1 if an ith word in the dictionary is present in the block, computing the relationship between any data points di and dj by evaluating $R(d_i,d_j)=|d_i.Td_i|/|d_i|$, wherein T is a thesaurus matrix whose ijth element reflects an extent of inclusion of meaning of jth word in the meaning of ith word, and clustering the data points.

7. The method of claim 6, wherein said dictionary is computed by taking a fraction of words, excluding said stop words, with a highest tfidf value, which is given by:

$$tfidf(w_i)=tf_i*\log(N/df_i)$$

where tfidf(wi) is the lead value of data point wi, tfi—a number of times the data point wi occurred in a whole text, dfi=a number of documents containing the data point wi and N=the a total number of documents in the text.

8. The method of claim 6, wherein said thesaurus matrix comprises any of a given identity matrix, and a computed matrix from a collection of documents.

9. The method of claim 6, wherein each block is represented by a vector whose ith element represents said frequency of occurrence of said ith word in the block.

10. The method of claim 6, further comprising organizing a set of text documents into a hierarchy of clusters by clustering given documents into sets of small sizes, wherein each smaller set is further subclustered; and repeatedly subclustering said smaller set until a terminating condition is reached.

11. The method of claim 10, further comprising organizing results returned by an information retrieval system in response to an user query into an hierarchy of clusters.

12. The method of claim 11, wherein the hierarchy is used to aid the user in any of modifying a query of said user and browsing through said results.

13. The method of claim 11, wherein said information retrieval system comprises a search engine retrieving Web documents.

14. The method of claim 5, wherein said step of generating is applied to vocabulary organization for a group of documents wherein the data points are words in a dictionary of the vocabulary, wherein the lead value of a word is any of its frequency of occurrence in the collection of documents, a number of documents containing the word, and a tfidf value of said word, wherein a relationship $R(d_i,d_j)$ denotes a fraction of documents containing a jth word that also contains an ith word, and the clustering of said data points results in a structured hierarchical organization of the vocabulary.

15. The method of claim 14, wherein a structured vocabulary is used to provide text summarization for associated documents.

16. The method of claim 14, further comprising applying the clustering to customer profiling wherein a dictionary is built and the vocabulary is organized using documents that are viewed by a customer.

17. The method of claim 5, wherein said data points correspond to products cataloged in an electronic store, the lead value of a product is its per unit profit, its per unit value or a number of items sold per unit time, and a relationship between the products is either explicitly defined or derived from purchase data.

18. The method of claim 17, wherein a product di is related to a product dj by the a fraction of customer transactions containing dj that also contain di.

19. The method of claim 17, further comprising applying the clustering to any of to an analysis of sales of a store for a merchant, and an organization of a layout of the store to facilitate easy access to products.

20. The method of claim 17, further comprising applying the clustering to personalize an electronic store layout to an individual customer by using a relationship that is specific to the individual customer.

21. The method of claim 5, further comprising applying the clustering to customer segmentation for a sales or service organization wherein the data points comprise customers in a database, wherein the lead values are any of a total purchase amount per unit time of said customers, income of said customers, a number of times customers visited an electronic store, and a number of items bought by the customer, wherein a relationship between customers is either explicitly defined or derived from some relevant data, with a resulting clustering reflecting a structured grouping of customers with similar performances.

22. The method of claim 21, wherein a customer di is related to a customer dj by a fraction of products bought by dj that are also bought by di.

23. A system for text summarization produced by clustering data points with defined quantified relation values between them, said system comprising:

means for obtaining a lead value for each data point, wherein said lead value for each data point is calculated by taking a sum of all relation values input into said data point weighted by a frequency of occurrence associated with said data point, means for ranking each data point in a lead value sequence list in descending order of lead value, means for assigning a first data point in said lead value sequence list as a leader of a first cluster, means for considering each subsequent data point in said lead value sequence list as a leader of a new cluster if its relationship with leaders of each of the previous clusters is less than a defined threshold value or as a member of at least one cluster where its relationship with a cluster leader is at least equal to said threshold value, wherein the threshold value is adaptively found for a given number of clusters, and means for generating said text summarization of any of a single document and a collection of documents by segmenting a given text input comprising said data points into clusters, and forming a set of leaders of said clusters to represent said text summarization.

24. The system of claim 23, wherein said quantified relationships between data points are any of symmetric and asymmetric quantified relationships.

25. The system of claim 23, wherein said frequency of occurrence equals one.

26. The system of claim 23, further comprising means for identifying distinct data points using said lead values and said relation values between said data points.

27. The system of claim 23, further comprising means for organizing a set of data points into a hierarchy of clusters using means for clustering the data points into sets of small sizes, wherein each smaller set is further subclustered; and repeatedly subclustering said smaller set until a terminating condition is reached.

28. The system of claim 23, wherein said means for generating further comprises:

means for segmenting a given input text into blocks comprising sentences, a collection of sentences, and paragraphs, means for excluding words belonging to a defined list of defined stop words, means for replacing words by their existing unique synonymous word from a given a collection of synonyms, means for applying stemming algorithms for mapping words to root words, means for representing resulting blocks of text, with respect to a dictionary which is either given or computed from the input text, by a binary vector of size equal to the number of words in the dictionary whose ith element is 1 if an ith word in the dictionary is present in the block, means for computing the relationship between any data points di and dj by evaluating $R(d_i,d_j)=|d_i.Td_j|/|d_i|$, wherein T is a thesaurus matrix whose ijth element reflects an extent of inclusion of meaning of jth word in the meaning of ith word, and means for clustering the data points.

29. The system of claim 28, wherein said dictionary is computed by taking a fraction of words, excluding said stop words, with a highest tfidf value, which is given by:

$$tfidf(wi)-tfi*\log(N/dfi),$$

where tfidf(wi) is the lead value of data point wi, tfi=a number of times the data point wi occurred in a whole text, dfi=a number of documents containing the data point wi and N=a total number of documents in the text.

30. The system of claim 28, wherein said thesaurus matrix comprises any of given identity matrix, and a computed matrix from a collection of documents.

31. The system of claim 28, wherein each block is represented by a vector whose ith element represents said frequency of occurrence of said ith word in the block.

32. The system of claim 28, further comprising means for organizing a set of text documents into a hierarchy of clusters by using means for clustering given documents into sets of small sizes, wherein each smaller set is further subclustered; and repeatedly subclustering said smaller set until a terminating condition is reached.

33. The system of claim 32, further comprising means for organizing results returned by an information retrieval system in response to an user query into an hierarchy of clusters.

34. The system of claim 33, wherein the hierarchy is used to aid the user in any of modifying a query of said user and browsing through said results.

35. The system of claim 33, wherein said information retrieval system comprises a search engine retrieving Web documents.

36. The system of claim 27, wherein said means for generating is used for vocabulary organization for a group of documents wherein the data points are words in a dictionary of the vocabulary, wherein the lead value of a word is any of its frequency of occurrence in the collection of documents, a number of documents containing the word, and a tfidf value of said word, wherein a relationship $R(d_i,d_j)$ denotes the a fraction of documents containing a jth word that also contains an ith word, and the clustering of said data points results in a structured hierarchical organization of the vocabulary.

37. The system of claim 36, wherein a structured vocabulary is used to provide text summarization for associated documents.

38. The system of claim 36, further comprising means for using the clustering for customer profiling wherein a dictionary is built and the vocabulary is organized using documents that are viewed by a customer.

39. The system of claim 27, wherein said data points correspond to products cataloged in an electronic store, the lead value of a product is its per unit profit, its per unit value or a number of items sold per unit time, and a relationship between the products is either explicitly defined or derived from purchase data.

40. The system of claim 39, wherein a product di is related to a product dj by a fraction of customer transactions containing dj that also contain di.

41. The system of claim 39, further comprising means for applying the clustering to any of an analysis of sales of a store for a merchant, and an organization of a layout or the store to facilitate easy access to products.

42. The system of claim 39, further comprising means for applying the clustering to personalize an electronic store layout to an individual customer by using a relationship that is specific to the individual customer.

43. The system of claim 27, further comprising means for applying the clustering for customer segmentation for a sales or service organization wherein the data points comprise customers in a database, wherein the lead values are any of a total purchase amount per unit time of said customers, income of said customers, a number of times customers visited an electronic store, and a number of items bought by the customer, wherein a relationship between customers is either explicitly defined or derived from some relevant data, with a resulting clustering reflecting a structured grouping of customers with similar performances.

44. The system of claim 43, wherein a customer di is related to a customer dj by a fraction of products bought by dj that are also bought by di.

45. A computer program product comprising computer readable program code stored on computer readable storage medium embodied therein for text summarization produced by clustering data points with defined quantified relation values between them, said computer program product comprising:

computer readable program code means for obtaining a lead value for each data point, wherein said lead value for each data point is calculated by taking a sum of all relation values input into said data point weighted by a frequency of occurrence associated with said data point,     computer readable program code means for ranking each data point in a lead value sequence list in descending order of lead value,     computer readable program code means for assigning a first data point in said lead value sequence list as a leader of a first cluster,     computer readable program code means for considering each subsequent data point in said lead value sequence list as a leader of a new cluster if its relationship with leaders of each of the previous clusters is less than a defined threshold value or as a member of at least one cluster where its relationship with a cluster leader is at least equal to said threshold value, wherein the threshold value is adaptively found for a given number of clusters, and     computer readable program code means for generating said text summarization of any of a single document and a collection of documents by segmenting a given text input comprising said data points into clusters, and forming a set of leaders of said clusters to represent said text summarization.

46. The computer program product of claim 45, wherein said quantified relationships between data points are any of symmetric and asymmetric quantified relationships.

47. The computer program product of claim 45, wherein said frequency of occurrence equals one.

48. The computer program product of claim 45, further comprising computer readable program code means for identifying distinct data points using said lead values and said relation values between said data points.

49. The computer program product of claim 45, further comprising computer readable program code means configured for organizing a set of data points into a hierarchy of clusters using computer readable program code means configured for clustering the data points into sets of small sizes, wherein each smaller set is further subclustered; and repeatedly subclustering said smaller set until a terminating condition is reached.

50. The computer program product of claim 45, wherein said computer readable program code means configured for generating further comprises:

computer readable program code means configured for segmenting a given input text into blocks comprising sentences, a collection of sentences, and paragraphs,     computer readable program code means configured for excluding words belonging to a defined list of defined stop words,     computer readable program code means configured for replacing words by their existing unique synonymous word, if it exists, from a given a collection of synonyms,     computer readable program code means configured for applying stemming algorithms for mapping words to root words,     computer readable program code means configured for representing resulting blocks of text with respect to a dictionary which is either given or computed from the input text, by a binary vector of size equal to the number of words in the dictionary whose ith element is 1 if an ith word in the dictionary is present in the block,     computer readable program code means configured for computing the relationship between any data points di and dj by evaluating $R(d_i,d_j)=|d_i.Td_i|/|d_i|$, wherein T is a thesaurus matrix whose ijth element reflects an extent of inclusion of meaning of jth word in the meaning of ith word, and     computer readable program code means configured for clustering the data points.

51. The computer program product of claim 50, wherein said dictionary is computed by taking a fraction of words, excluding said stop words, with a highest tfidf value, which is given by:

$$tfidf(wi)=tfi*\log(N/dfi).$$

where tfidf(wi) is the lead value of data point wi, tfi—a number of times the data point wi occurred in a whole text, dfi—a number of documents containing the data point wi and N=a total number of documents in the text.

52. The computer program product of claim 50, wherein said thesaurus matrix comprises any of given identify matrix, and a computed matrix from a collection of documents.

53. The computer program product of claim 50, wherein each block is represented by a vector whose ith element represents said frequency of occurrence of said ith word in the block.

54. The computer program product of claim 50, further comprising computer readable program code means configured for organizing a set of text documents into a hierarchy of clusters by using computer readable program code means configured for clustering given documents into sets of small sizes, wherein each smaller set is further subclustered; and repeatedly subclustering said smaller set until a terminating condition is reached.

55. The computer program product of claim 54, further comprising computer readable program code means configured for organizing results returned by an information retrieval system in response to an user query into an hierarchy of clusters.

56. The computer program product of claim 55, wherein the hierarchy is used to aid the user in any of modifying a query of said user and browsing through said results.

57. The computer program product of claim 55, wherein said information retrieval system comprises a search engine retrieving Web documents.

58. The computer program product of claim 49, wherein said computer readable program code means configured for generating is used for vocabulary organization for a group of documents wherein the data points are words in a dictionary of the vocabulary, wherein the lead value of a word is any of its frequency of occurrence in the collection of documents, a number of documents containing the word, and a tfidf value of said word, wherein a relationship $R(d_i,d_j)$ denotes a fraction of documents containing a jth word that also contains an ith word, and the clustering of said data points results in a structured hierarchical organization of the vocabulary.

59. The computer program of claim 58, wherein a structured vocabulary is used to provide text summarization for associated documents.

60. The computer program product of claim 58, further comprising computer readable program code means configured for using the clustering for customer profiling wherein a dictionary is built and the vocabulary is organized using documents that are viewed by a customer.

61. The computer program product of claim 49, wherein said data points correspond to products cataloged in an electronic store, the lead value of a product is its per unit profit, its per unit value or a number of items sold per unit time, and a relationship between the products is either explicitly defined or derived from purchase data.

62. The computer program product of claim 61, wherein a product di is related to a product dj by a fraction of customer transactions containing dj that also contain di.

63. The computer program product of claim 61, further comprising computer readable program code means configured for applying the clustering to any of an analysis of sales of a store for a merchant, and an organization of a layout of the store to facilitate easy access to products.

64. The computer program product of claim 61, further comprising computer readable program code means configured for applying the clustering to personalize an electronic store layout to an individual customer by using a relationship that is specific to the individual customer.

65. The computer program product of claim 49, further comprising computer readable program code means configured for applying the clustering for customer segmentation for a sales or service organization wherein the data points comprise customers in a database, wherein the lead values are any of a total purchase amount per unit time of said customers, income of said customers, a number of times customers visited an electronic store, and a number of items bought by the customer, wherein a relationship between customers is either explicitly defined or derived from some relevant data, with a resulting clustering reflecting a structured grouping of customers with similar performances.

66. The computer program product of claim 65, wherein a customer di is related to a customer dj by a fraction of products bought by dj that are also bought by di.

* * * * *